US005894540A

United States Patent [19]

Drewing

[11] Patent Number: 5,894,540
[45] Date of Patent: Apr. 13, 1999

[54] OPTICAL FIBER TAKE-UP ASSEMBLY

[75] Inventor: Dennis D. Drewing, Totowa, N.J.

[73] Assignee: Lucent Technologies Inc., Murray Hill, N.J.

[21] Appl. No.: 08/862,014

[22] Filed: May 22, 1997

[51] Int. Cl.$^6$ ........................................... G02B 6/00

[52] U.S. Cl. ........................................... 385/135; 385/137

[58] Field of Search ................................. 385/135, 134, 385/136, 137

[56] References Cited

U.S. PATENT DOCUMENTS

| 4,840,449 | 6/1989 | Ghandeharizadeh | 385/135 |
| 5,142,661 | 8/1992 | Grant et al. | 385/135 |

*Primary Examiner*—Phan T. H. Palmer

[57] ABSTRACT

An optical fiber take-up assembly including a plurality of adjustably positionable spools mounted to a support plate. When the fiber has a rigid fusion splice protector, the spacing between the spools is adjusted so that the splice protector is positioned along a straight length of the fiber between a pair of spools.

8 Claims, 4 Drawing Sheets

OPTICAL FIBER TAKE-UP ASSEMBLY

This invention was made with Government support. The Government has certain rights in this invention.

BACKGROUND OF THE INVENTION

This invention relates to an assembly for storing a length of optical fiber between its connected ends and, more particularly, to such an assembly which stores the fiber securely without slack and accommodates a rigid splice protector therein.

Individual optical fibers used for interconnecting electro-optical modules are typically provided as "pig tail" assemblies extending out of the respective modules. The field installer makes a fusion splice of a pair of the fibers and covers the splice with a rigid splice protection sleeve. The spliced fiber then has a strain relief boot (part of the pig tail) at each end for interconnecting two electro-optical modules. When this is done, there will be a length of loose fiber which must be stored in some manner for protection. Splice trays or boxes are presently available which contain clips into which the splice protection sleeve can be inserted, and the excess fiber is then looped in the tray. This is not entirely satisfactory, especially when the equipment is mounted in a moving vehicle, such as a ship, an airplane or a truck, which is subject to vibration. It would therefore be desirable to have a storage assembly for optical fibers, especially those with a fusion splice protector, which does not suffer from any of the disadvantages of the presently available enclosures, and which is robust so that it protects the fiber even in a vibration-prone environment.

In addition, the optical fibers must be maintained with a minimum bend radius to avoid signal loss. Accordingly, any such excess fiber storage assembly must meet the minimum bend radius requirement.

SUMMARY OF THE INVENTION

According to the present invention, there is provided an assembly for holding a length of filamentary material, in particular an optical fiber having a rigid fusion splice protector, in a wrapped configuration with a minimum bend radius. The assembly comprises a support plate and at least two spools. Each of the spools has a radius of at least the minimum bend radius and each of the spools subtends an arc of at least 180°. Associated with the support plate and the spools is mounting structure adapted to secure the spools to the support plate with the center of radius of each of the spools lying along a straight line. The mounting structure is also adapted to allow selective adjustment of the spacing between the spools. Accordingly, the fiber can be wrapped around the spools and the spacing between the spools can be adjusted so as to take up the slack in the fiber. Since the rigid fusion splice protector must be positioned along a straight length of the fiber between the spools during the wrapping process, the spool spacing adjustability is utilized to effect this positioning.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
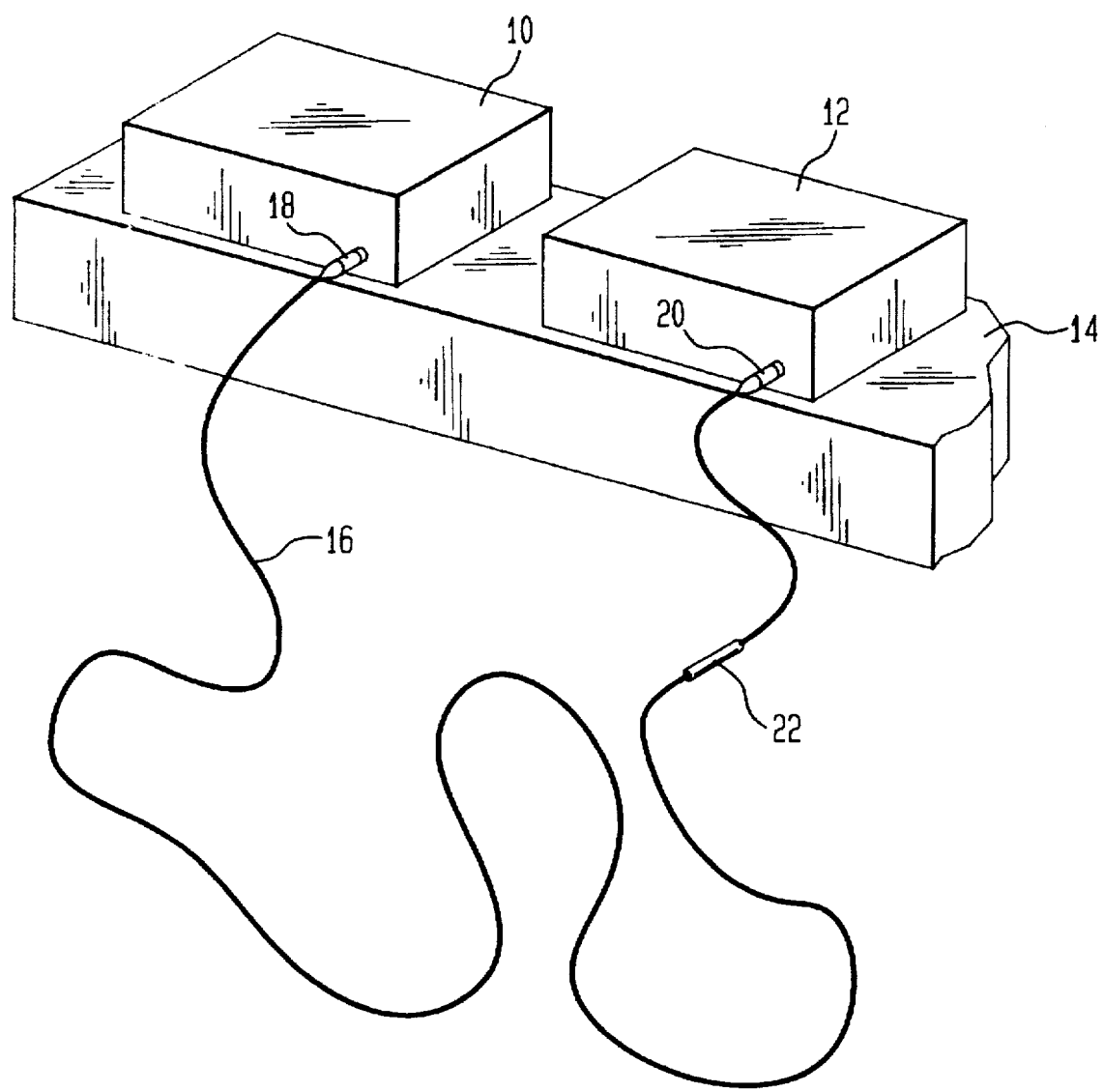
FIG. 1 is a perspective view showing an optical fiber with a fusion splice protector interconnecting a pair of electro-optical modules.

Referring now to the drawings, FIG. 1 illustrates a pair of electro-optical modules 10, 12 supported on, and preferably secured to, the shelf 14. The modules 10, 12 are interconnected by an optical fiber 16 terminated by the strain relief boots 18, 20 and having a rigid fusion splice protector 22 covering a fusion splice along its length. As is clear from the drawing, excess fiber is loosely draped between the entries into the modules 10, 12. The optical fiber 16 is relatively fragile and the excess fiber must be properly stored to prevent it from being damaged. In addition, such storage must take place with minimum bend radius of the fiber to avoid signal transmission losses therethrough.

Figure 2:
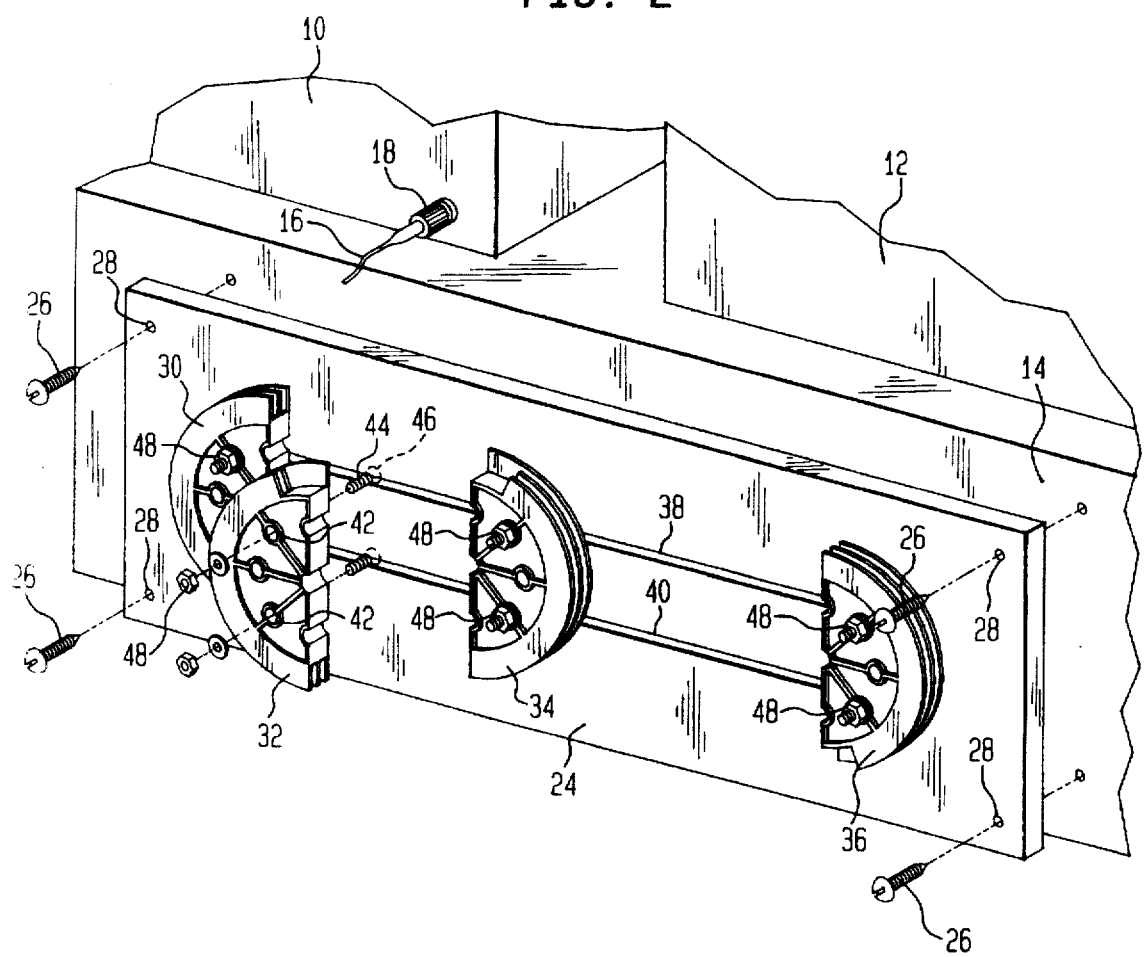
FIG. 2 is an exploded perspective view of an optical fiber take-up assembly constructed in accordance with the principles of this invention.

The inventive take-up assembly shown in FIG. 2 provides secure, robust, vibration resistant storage for the excess optical fiber while maintaining a minimum bend radius for the fiber. The assembly includes a support plate 24 preferably secured to the front face of the shelf 14 by screws 26 extending through apertures 28 in the corners of the support plate 24. The assembly further includes a plurality of spools, illustratively four in number, 30, 32, 34, 36, each of which has a radius to its fiber support surface of at least the minimum bend radius of the fiber 16. Each of the spools 30, 32, 34, 36 subtends an arc of at least 180°. Illustratively, each of the spools 30, 32, 34, 36 subtends exactly a 180° arc. Mounting structure is provided for securing the spools 30, 32, 34, 36 to the support plate 24. This mounting structure aligns the spools 30, 32, 34, 36 with their centers of radius lying along a straight line and allows selective adjustment of the spacing between the spools 30, 32, 34, 36.

The illustrative mounting structure includes a pair of rails on the support plate 24 extending parallel to the straight line passing through the centers of radius of the spools. Illustratively, the pair of rails are in the form of a pair of elongated slots 38, 40 through the support plate 24. Each of the spools 30, 32, 34, 36 is formed with a pair of apertures 42 along a line which is orthogonal to a radius of the respective spool which bisects the arc subtended by that spool. For each of the spools 30, 32, 34, 36 there is a pair of fasteners, each fastener illustratively being a threaded rod 44 having an enlarged head 46 at one end and a mating nut 48 threaded thereon at the other end. The rod 44 passes through one of the slots 38, 40 and one of the apertures 42 so that the respective one of the spools 30, 32, 34, 36 is clamped to the support plate 24 between the head 46 and the nut 48.

Figure 3:
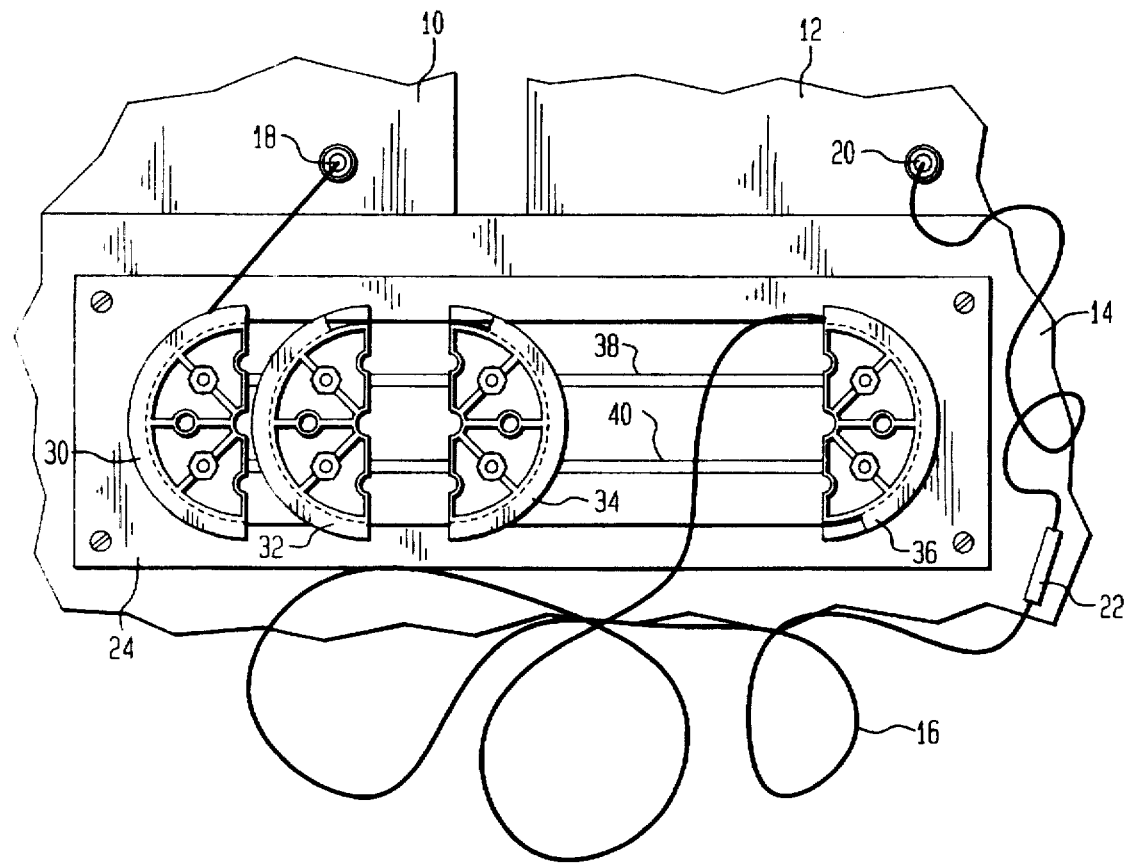
FIGS. 3-5 illustrate steps in the wrapping of an optical fiber on the inventive assembly.
Figure 4:
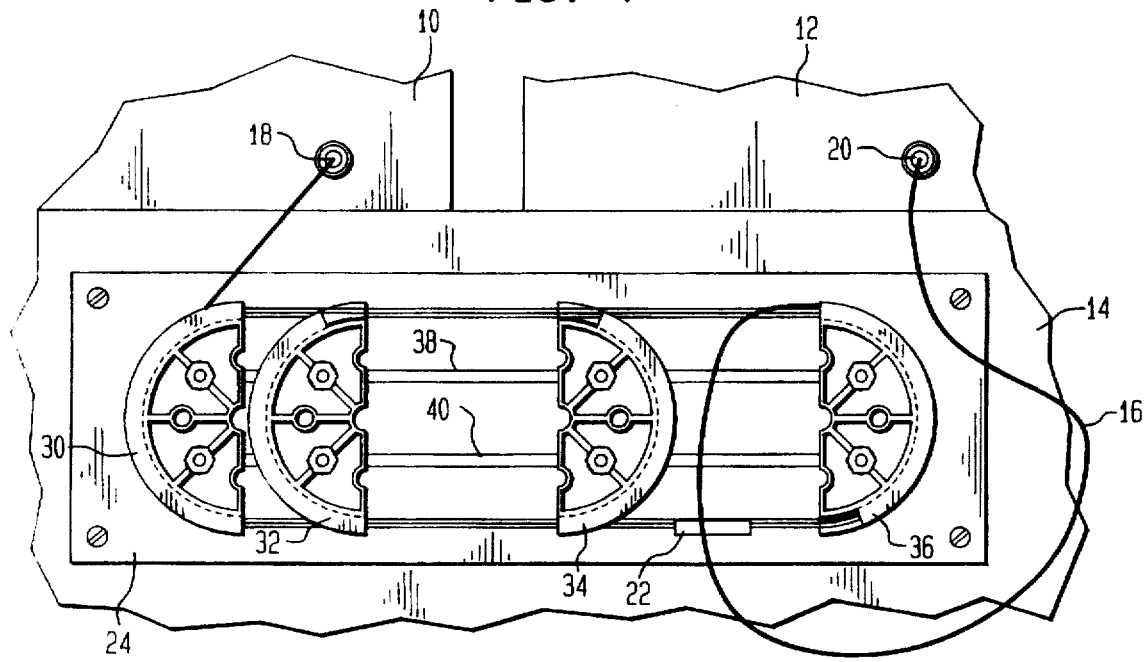
Figure 5:
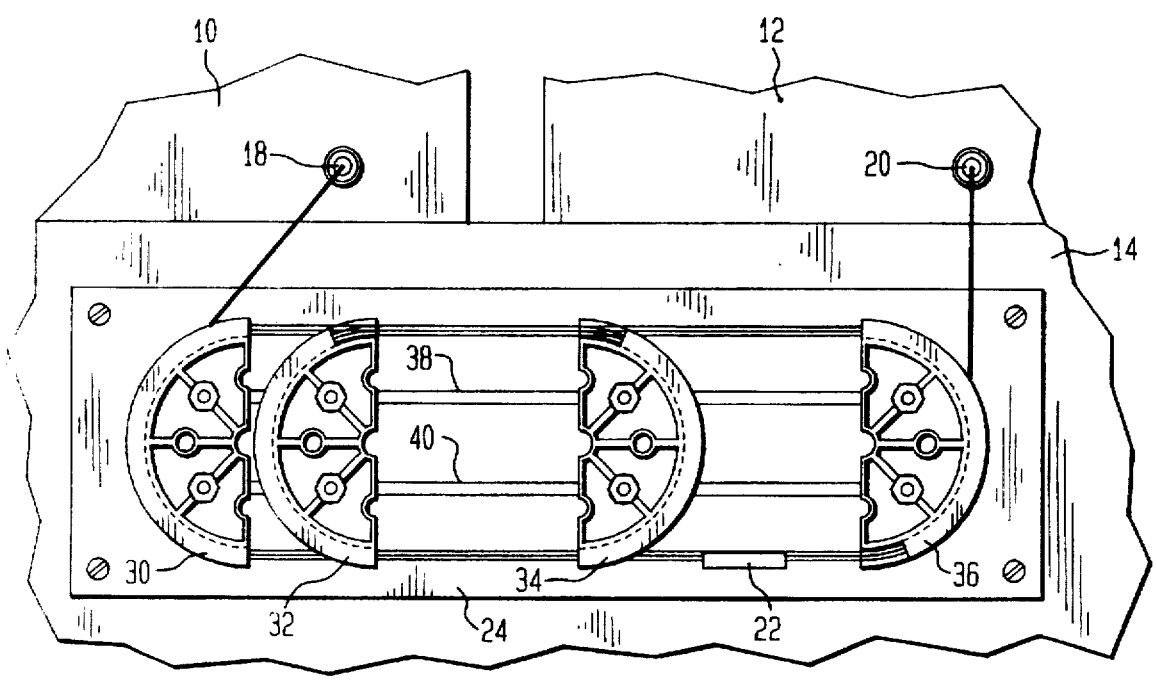

FIGS. 3-5 illustrate the wrapping of the fiber 16 around the spools 30, 32, 34, 36. As shown in FIG. 3, starting at the boot 18 the fiber 16 is wrapped around the periphery of the spool 30 without slack. The mounting of the outer spools 30, 36 is such that they are oriented with their subtended arcs providing at least 180° of subtended arc for wrapping the fiber 16 at opposite ends of the assembly. After the fiber 16 is wrapped around the spool 30, it is wrapped around the spool 36 and then again around the spool 30, all without slack, until the rigid splice protector 22 is reached. Because the splice protector 22 is rigid, it cannot be wrapped around one of the spools, since it is not conformable to the curvature of the fiber support surface of the spool. Accordingly, the rigid splice protector 22 must be positioned along a straight length of the fiber 16 between a pair of the spools. If the initial wrapping results in the splice protector 22 falling on the periphery of one of the spools 30, 36, the spacing between the spools 30, 36 is adjusted and the wrapping redone until the splice protector 22 is where it should be, as shown in FIG. 4. The wrapping then continues until a final complete wrap cannot be attained around the outer spools 30, 36. This is when the intermediate spools 32, 34 become of use. The remaining fiber is wrapped around the spools 32, 34 and around the spool 36 with some slack, and then the positions of the intermediate spools 32, 34 are adjusted to take up all such slack, as shown in FIG. 5.

The aforedescribed wrapping procedure is one of trial and error, requiring that the positions of the spools 30, 32, 34, 36 be adjusted until the fiber 16 is wrapped without any slack and the rigid splice protector 22 is properly positioned. The nuts 48 are then tightened on the rods 44. This provides a robust, rugged and vibration resistant solution to the problem of holding excess fiber. Because the fiber 16 is held without slack, it is maintained in place between the flanges of the spools 30, 32, 34, 36. In addition, the aforedescribed assembly provides a low profile excess fiber storage facility which is useful in confined spaces.

While the described take-up assembly has been shown as being in a generally vertical plane with the optical fiber exiting the modules generally horizontally, it will be appreciated that a minimum bend radius of the fiber must be maintained over its entire length. Therefore, in actual practice, either the take-up assembly will be in the same plane as the fibers exiting the modules or there will be provided a bend limiter (such as a spool) between each strain relief boot and the take-up assembly.

Accordingly, there has been disclosed an improved optical fiber take-up assembly which stores excess fiber securely without slack and accommodates a rigid splice protector. While an illustrative embodiment of the present invention has been disclosed herein, it will be apparent to one of ordinary skill in the art that various modifications and adaptations to the disclosed embodiment are possible and it is intended that this invention be limited only by the scope of the appended claims.

What is claimed is:

1. An assembly for holding a length of filamentary material in a wrapped configuration with a minimum bend radius, comprising:

a support plate;

at least two spools each having a radius of at least said minimum bend radius and each subtending an arc of at least 180°; and mounting structure associated with said support plate and said spools and adapted to secure said spools to said support plate with the center of radius of each of said spools lying along a straight line, said mounting structure further adapted to allow selective adjustment of the spacing between said spools;

whereby the filamentary material can be wrapped around the spools and the spacing between the spools can be adjusted so as to take up the slack in the filamentary material.

2. The assembly according to claim 1 wherein said mounting structure includes:

a pair of rails on said support plate extending parallel to said straight line; and a respective pair of fasteners associated with each of said spools, each of said pair of fasteners adapted to secure its respective spool to a respective one of said pair of rails along the length of said one rail, said pair of fasteners being secured to the respective spool along a straight line which is orthogonal to a radius of the respective spool which bisects the arc subtended by the respective spool.

3. The assembly according to claim 2 wherein:

said pair of rails are in the form of a pair of elongated slots through said support plate;

each of said fasteners includes a threaded rod having an enlarged head at one end and a mating nut threaded thereon at another end; and each of said spools is formed with a pair of apertures each on said orthogonal straight line;

wherein each of the rods extends through a respective spool aperture and a respective slot to clamp the spool to the support plate between the enlarged head and the mating nut.

4. The assembly according to claim 1 wherein each of said spools subtends an arc of 180°.

5. The assembly according to claim 4 wherein there are three spools.

6. The assembly according to claim 4 wherein there are four spools.

7. A method for wrapping a length of filamentary material which is fixed at two points, the wrapping being effected with a minimum bend radius and without slack between the two points, comprising the steps of:

(a) providing a support plate;

(b) providing at least two spools, each of the spools having a radius of at least the minimum bend radius and each of the spools subtending an arc of at least 180°;

(c) mounting the spools to the plate with their centers along a straight line and in such manner that the spacing between the spools is adjustable, the spools being so oriented that the subtended arcs of the two outer spools provide at least 180° of wrap at opposite ends of the straight line;

(d) wrapping the filamentary material around the spools without slack until a final complete wrap cannot be attained;

(e) adjusting the spacing between the spools and rewrapping the filamentary material around the spools without slack until a final complete wrap with slack is attained; and (f) adjusting the spacing between the spools to take up all slack in the filamentary material.

8. The method according to claim 7 wherein the filamentary material includes a rigid straight portion, and wherein the steps (d) and (e) include insuring that the rigid straight portion is maintained along a straight length of said filamentary material between a pair of said spools.

* * * * *